Figure 1:
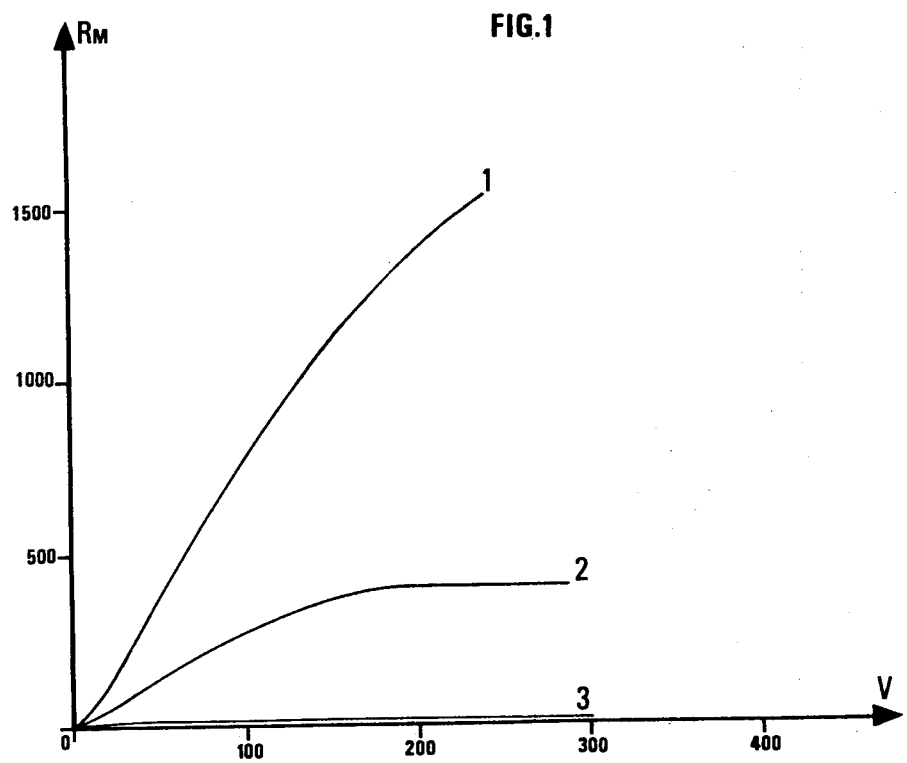

United States Patent [19]

Ballerini et al.

[11] 4,412,925

[45] Nov. 1, 1983

[54] ASSISTED OIL RECOVERY WITH USE OF FERMENTATION FLUIDS

[75] Inventors: Daniel Ballerini, Saint Germain en Laye; Odile Chaudé, Sevres; Guy Chauveteau, Rueil Malmaison; Norbert Kohler, Paris; Jean-Paul Vandecastele, Fourqueux, all of France

[73] Assignees: Institut Francais du Petrole, Rueil-Malmaison; Rhone-Poulenc Industries, Paris, both of France

[21] Appl. No.: 920,522

[22] Filed: Jun. 29, 1978

[30] Foreign Application Priority Data

Jul. 25, 1977 [FR] France .............................. 77 23008

[51] Int. Cl.$^3$ .............................................. C09K 3/00
[52] U.S. Cl. ............................ 252/8.55 D; 536/114; 252/8.55 R
[58] Field of Search .................... 252/8.55 D, 8.55 C, 252/8.55 R; 424/127, 270; 195/31 P; 536/1, 114

[56] References Cited

U.S. PATENT DOCUMENTS

| 3,376,125 | 4/1968 | McConnell | 424/127 |
| 4,105,431 | 8/1978 | Lewis et al. | 252/8.55 R |
| 4,119,491 | 10/1978 | Wellington | 252/8.55 D |
| 4,132,780 | 1/1979 | McConnell | 424/127 |
| 4,141,842 | 2/1979 | Abdo | 252/8.55 D |
| 4,182,860 | 1/1980 | Naslund et al. | 252/8.55 D |

*Primary Examiner*—Josephine Barr
*Attorney, Agent, or Firm*—Millen & White

[57] ABSTRACT

An aqueous composition is provided, suitable for direct use in waterflood oil recovery processes, which comprises the clarified fermentation fluid obtained by
  (a) culturing a polysaccharide-producing microorganism in an aqueous culture medium to produce an aqueous culture containing dissolved polysaccharide therein; and
  (b) clarifying the resultant aqueous culture from (a) by at least one of centrifugation and filtration, introducing therein at least one bactericidal agent, and recovering the resultant clarified fermentation fluid;

said aqueous composition being obtained without precipitation and recovery of a solid polysaccharide and dissolution thereof in an aqueous medium.

The above composition can be pumped into oil formations without substantial clogging thereof.

22 Claims, 2 Drawing Figures

ASSISTED OIL RECOVERY WITH USE OF FERMENTATION FLUIDS

This invention concerns an improvement to oil recovery from oil formations by injection of solutions of bio-polymers prepared by reacting microorganisms with carbohydrates; it particularly relates to the direct injection, without bio-polymers isolation, of the fermentation fluid prepared according to this method, after separation of at least the major portion of the cell residues by centrifugation or filtration and addition of a bactericide.

Attention has been paid these last years to the fact that, when adding to aqueous fluids substances which increase their viscosity, the operations of assisted (secondary or tertiary) recovery effected in the oil fields may be substantially improved; for example, the amount of crude oil to be recovered from an underground formation may be substantially increased.

When selecting water or brine containing a thickening agent in sufficient concentration to impart sufficient viscosity to approach that of oil, the tendency of water or brine to flow out selectively is reduced, so that the oil is displaced smoothly as with a piston.

These water-soluble thickening agents must comply with a number of physical and chemical criteria, besides price criteria. Considering the conditions of injection into the wells, such solutions must be stable, irrespective of temperature, salt concentration and pH, and they must be bacteria-resistant. They must also have good rheological properties; for example, they must be resistant to the mechanical constraints to which they are subjected when circulated in the surface plants and when injected into the formation. They must be able to propagate in the porous medium without loss of their intrinsic properties, and this even at low flow rates.

For all these reasons, a limited number of water-soluble polymers have been tested for oil recovery, either by injection of polymers into the oil formations or by simultaneous or successive injections of surfactive agents or microemulsions and these water-soluble polymers.

A number of patents and publications have disclosed the use of bio-polymers obtained by reacting selected microorganisms with fermentation media containing carbohydrates. These microorganisms may be, for example, bacteria of the Xanthomonas genus, particularly the *Xanthomonas campestris, Xanthomonas begoniae, Xanthomonas pisi, Xanthomonas vesicatoriae, Xanthomonas carotae, Xanthomonas hederae, Xanthomonas incanae, Xanthomonas malvacearum, Xanthomonas phaseoli, Xanthomonas vasculorum, Xanthomonas vitians* and *Xanthomonas pelargonii* species, of the Arthrobacter genus, particularly the *Arthrobacter stabilis* and *Arthrobacter viscosus* species, of the Erwinia genus, particularly the *Erwinia Tahitica* species, of the Azotobacter genus, particularly the *Azotobacter indicus* species, etc. or fungi of the Sclerotium genus, particularly the *Sclerotium glucanicum* and *Sclerotium rolfsii* species, etc.

The carbohydrates may be, for example, glucose, sucrose, fructose, lactose, galactose, soluble starch, corn starch, flours from various cereals, etc. Such carbohydrates are not necessarily used as highly refined materials; thus sugar-cane or sugar-beet molasses, or various residues of high sugar content may be used.

In most of cases, the bio-polymers formed by fermentation in aqueous solution from these microorganisms are separated from the aqueous medium to be thereafter recovered in the solid state. They are dissolved again into water or brine to be used by injection into the wells, by admixing under stirring.

When biopolymers in the solid state are desired, the fermentation fluids are serially treated to separate said biopolymers from the aqueous medium according to known techniques, and preferably by solvent precipitation with alcohols such as methanol, ethanol or isopropanol, ketones such as acetone, etc., which solvents are thereafter recycled. The biopolymers are then separated by filtration or centrifugation and eventually subjected to further purification. If necessary, they are separated once more by filtration or centrifugation, and then dried according to various processes of the art.

Examples of available products of this type are Kelzan MF and Xanflood from Kelco Co., Rhodopol 23 from Rhone Poulenc Co., Polytran CS 11 from CECA Co., etc.

It has also been suggested to use the crude fluid obtained at the end of the fermentation instead of the biopolymer separated from the cell residues and purified by solvent precipitation.

Various tests have been effected to determine the conditions which must be satisfied by the aqueous solutions of the polysaccharides of the trade or prepared according to processes of the art; it has been found that, if the conditions of viscosity and stability of these solutions with respect to salt concentration, pH and temperature are satisfied with most of them, the same is not true as concerns the rheological properties, particularly those related to injectivity into the oil formations and those resulting from the circulation in the porous medium, which are far from satisfactory. It has thus been found that, if resistance to flow of the injected solution is relatively high in the close vicinity of the injection well, due to passage through apertures which are relatively narrow and often blocked with sand, this resistance decreases sharply when the same solution enters into the formation. At a distance of some tens of meters from the well, the pressure drop is practically negligible and the flow rate is extremely low. If the biopolymer solution must resist, without loss of intrinsic properties, to relatively great pressure drop when entering into the formation, it is also true that it must also thereafter flow slowly without clogging and loss of viscosity in the inside of the formation.

Many patents and publications are concerned with means for solving the problem of clogging, in the vicinity of the formation, through impurities of any type present in the biopolymer powder. The separation of the polysaccharide from the residues of bacterial cells is effected according to techniques of the art, for example filtration through diatomaceous earth, reaction with enzymes of the protease type, reaction with sodium hydroxide, flocculation with bentonite, etc. When using these techniques, it is possible to inject the solutions of biopolymer into formations of great or limited permeability without clogging of the inlet face. It has however been found that, if the pressure drop decreases or the flow rates are approximately the same as those met in the formations, most of these clarification techniques have little effect and the aqueous solutions of most of the polysaccharides of the trade quickly clog the porous medium. It follows that the flow of their aqueous solutions is strongly reduced, if not completely stopped.

It has also been found that the direct use of the crude fermentation fluids and that of the biopolymer separated by precipitation from the aqueous fermentation solution both lead to unsatisfactory results.

The present invention relates to a water-soluble thickening composition, based on polysaccharides, which may be used, for example, in the operations of assisted oil recovery; this composition comprises (a) at least one crude fermentation fluid of a polysaccharide producing microorganism, which fluid has been clarified by filtration and/or centrifugation, and (b) at least one bactericide agent.

The present invention also discloses the direct use of the same crude fermentation fluids with added bactericide agent for assisted oil recovery. These fermentation fluids have thus been subjected to a mere physical treatment of removal of the major part of the cells (clarification) by filtration and/or centrifugation, any isolation treatment by precipitation being excluded. The so-treated fermentation fluids with added bactericide possess outstanding flow properties, irrespective of the high or low pressure drop.

The enzymatic or chemical clarification treatments do not yield so good results.

As concerns the contemplated use, i.e. assisted oil recovery, the fermentation fluids may be used alone or together with solutions of surfactive agents, or as mobility plug following microemulsion injection. The surfactive agents are, for example:

non-ionic, such as the condensation products of ethylene oxide with fatty alcohols or alkylphenols anionic, such as the alkali metal sulfonates, for example, the alkylsulfonates, the arylsulfonates or the alkylarylsulfonates, the di-alkyl sulfates or the mixed alkyl and alkanolamine or alkali metal sulfates.

The fermentation fluids to be used according to the invention are prepared by fermentation according to the known techniques disclosed above. The most appropriate microorganisms are of the Xanthomonas type, among which *Xanthomonas campestris* is particularly well adapted. The fermentation is interrupted when a sufficient concentration of dissolved polymer has been attained, which is easily estimated by viscosity determination; the micro-organism cells are then separated by solid/liquid fractionation processes such as filtration, for example through a bed of diatomaceous earth or through a calibrated filter, for example of the Millipore type. The filtration surfaces or agents with an average pore diameter of 3 microns or less, preferably less than 1 micron, are preferred. According to a preferred embodiment, this fractionation is effected by centrifugation, particularly at 4,000 g or more, preferably 6,000 to 60,000 g. It has been found that the solutions obtained by ultracentrifugation have the lowest tendency to clog the porous medium, even lower than those obtained by mere filtration. A combination of centrifugation and filtration may be used, as shown in the Examples.

The biopolymer solution is advantageously made resistant to possible bacterial decay by adding bactericides such as sodium azide, formaldehyde, alkali metal salts of chlorophenols, such as those sold by Rhone Poulenc Co. under the trade mark Cryptogil, mercury salts such as, for example, the ethylmercury thiosalicylates, the phenylmercury salts (for example acetate, borate or nitrate), chlorhexidine, 1,2-benzisothiazolone sold by Imperial Chemical Industries Co. under the trade mark Proxel AB Pate, a mixture of 5-chloro-2-methyl-4-isothiazolin-3-one and 2-methyl-4-isothiazolin-3-one sold by Rohm and Haas Co. under the trade mark Kathon, etc. According to a preferred embodiment, the fermentation fluid is made free of cells and stabilized by addition of sodium azide ($NaN_3$) which is used in an amount of, for example, 10 to 20,000 parts per million by weight (ppm), preferably 100 to 1,000 ppm. According to an other preferred embodiment, Kathon is used in an amount of 10 to 1,000 ppm. It has been found, and this has not been explained up to now, that these two compounds possess not only a preservative bactericide effect but also a direct effect on the ability of the fermentation fluids to pass through the porous medium. This effect is not obtained to such an extent with conventional bactericides.

In fact, if certain bactericides appear equivalent when tested at the ground surface, quite different behaviours are observed in the presence of the formation bacteria, in contact with the elements of this formation (rock, water, oil). In these conditions, sodium azide and Kathon give exceptional results, far better than those obtained, for example, with alkali metal salts of chlorophenols.

The biopolymer solution may be stored in containers and transported to the vicinity of the injection well by any adapted means, road, rail, ship, pipe, etc. If permitted by the plant in the vicinity of the oil field, the biopolymer solution may be manufactured on the field in sterile formation vessels of continuous or discontinuous type, as known in the art.

The biopolymer solution may be brought to the desired concentration or viscosity by dilution with formation water or injection brine. The useful concentrations of the biopolymer are usually between 0.005 and about 1.0 percent by weight and commonly between 0.05 and about 0.25% b.w. Such concentrations impart to the injection water containing various amounts of dissolved salts a viscosity of at least 2 centipoises at the reservoir temperature, but viscosities of about 30 centipoises or more may usefully be utilized in some cases. Such viscosities are usually sufficient to ensure an effective mobility reduction of the injection water and thus ensure better displacement of oil from the formation. If necessary, the pH of the biopolymer solution may be adjusted to the balanced pH of the formation and the oxygen content thereof may be controlled.

The biopolymer solution thus treated may then be pumped into the oil formation through one or more injection wells in conventional manner.

From an economic point of view it could appear advantageous to directly use a fermentation fluid (the expensive treatments of biopolymer isolation and re-dissolution once isolated are thus avoided); it was however foreseen that the crude biopolymers thus injected would present some disadvantages, as compared with the isolated and purified biopolymers, for example, quicker clogging of the medium.

It is thus quite unobvious to remark, as shown in the following examples, that it is on the contrary extremely advantageous to directly use the fermentation fluid, when clarified by filtration and/or centrifugation and treated with a bactericide, not only from an economic point of view, but above all since no clogging of the porous medium occurs. In the same experimental conditions, the powdered polysaccharides of the trade, when isolated and purified, have not the same advantages; for example, they hardly propagate in the porous medium which finally clogs.

FLOW TEST

To make clogging apparent in the formation conditions, a so-called flow test is carried out; it comprises the following operations:

(a) The biopolymer solution prepared in standard conditions is first clarified by filtration under a constant pressure of 1 kg/cm² through 3 successive Millipore filters (distributed by Millipore Filter Corporation, Bedford, Mass., U.S.A.) of 3μ pore size and 142 mm diameter, then through a Millipore filter of 0.8μ pore size and 142 mm diameter. The resulting biopolymer solution is free of practically all bacterial residues and thus perfectly limpid.

(b) A pump is then operated to inject this clarified solution at constant flow rate through a Millipore filter of pore diameter higher than 0.8μ. This injection is preferably carried out at a rate adapted to that observed in the formation. A differential pressure register is used to measure the pressure drop on both sides of the filter, as a function of time. The viscosity of the fractions at the inlet and outlet of the filter may be measured, if necessary.

Simultaneous to this flow test, an injection of the same biopolymer solution (clarified according to the above process) may be effected into a consolidated porous medium whose pore size is identical to that of the Millipore filter utilized. The pressure drop at the inlet and outlet of this porous medium may also be measured, and the aptitude to clogging of the polysaccharide solutions may be deduced therefrom.

All the results of the flow test and also those of the comparison test of injection into a porous medium are expressed as the mobility reduction $R_M$ defined as:

$$R_M = \frac{k_{dissolution\ water}}{k_{biopolymer\ solution}} \times \frac{\eta_{biopolymer\ solution}}{\eta_{dissolution\ water}}.$$

where k is the permeability of the fluid concerned through the filter or the porous medium and η the viscosity of the same fluid. It is found in practice that, at a given rate of flow, $R_M$ corresponds to the ratio of the respective pressure drops, through the filter or the porous medium, of the polysaccharide solution, on the one hand, and of the dissolution water, on the other hand, in the same conditions of pH and temperature.

Figure 2:
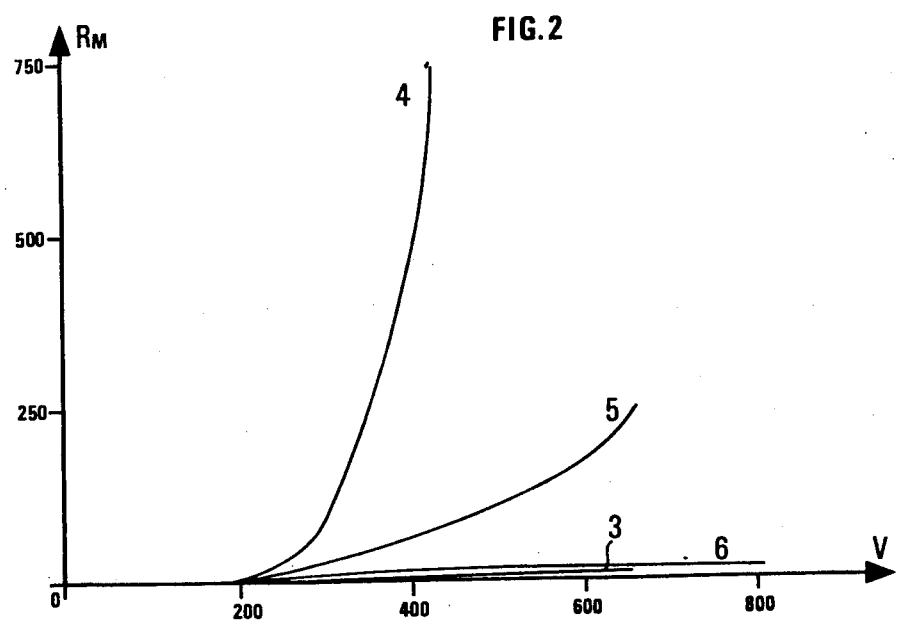

The process of the invention is illustrated by the following examples 3 and 6 which illustrate all its advantages. Examples 1, 2, 4, 5, 7 and 8 are given for comparison purposes. FIGS. 1 and 2 show the values of the mobility reduction $R_M$ with respect to the volume V in cm³ of the polysaccharide solution injected through the Millipore filter, as shown in the following examples:

EXAMPLE 1

A powdered polysaccharide of the trade, Kelzan MF, commercialized by the Kelco Co. and synthesized by the *Xanthomonas campestris*-microorganism, when grown on carbohydrates, is dispersed in conventional manner in brine formed of 5 g NaCl per liter water at pH 8, which brine was pre-filtered through a Millipore filter of 0.22μ pore size. The polysaccharide concentration of this solution is decreased to 400 ppm by dilution with the same pre-filtered brine and it is maintained unstirred under nitrogen for 24 hours in an appropriate container.

The solution is then filtered under 1 kg/cm² pressure, first through 3 successive Millipore filters of 3μ pore size and 142 mm diameter and then through a Millipore filter of 0.8μ pore size and same diameter, this clarification treatment yielding a solution free of bacterial residues.

This solution is then injected with a pump at a constant rate of 0.25 meter per day through a 3μ Millipore filter of 47 mm diameter contained in a filter container and maintained at a constant temperature of 30° C. The pressure drop is measured at the inlet and outlet of the filter and a curve of mobility reduction $R_M$ is deduced therefrom versus injected volume (graph 1, FIG. 1). It is found that $R_M$ increases quickly with the injected volume and attains values of about 850 and 1360 for 100 and 200 cm³ of injected solution respectively.

An identical solution is prepared and pre-filtered in the same conditions as above, which solution also contains a bactericide (0.04% b.w. of sodium azide); it is injected at a constant rate of 0.05 meter per day into a sandstone core from Fontainebleau of 2 cm length and 5 cm diameter, whose water permeability is about 45 millidarcies and porosity 9%. The evolution of the pressure drop at the ends of the sample is determined and the evolution of the mobility reduction $R_M$ is deduced therefrom. It is found that this mobility reduction increases quickly with the volume of the injected Kelzan solution, expressed as the number of unit pore volume of the sample (Table I).

The Kelzan MF solution freed of bacterial residues thus clogs both a 3μ Millipore filter and a medium of comparable permeability. This clogging occurs, irrespective of the pre-clarification of the polysaccharide solution by passage under high pressure through 3 filters of 3μ pore size and a 0.8μ filter.

TABLE I

|  | VOLUMES of PORES ($V_p$) | MOBILITY REDUCTION ($R_M$) |
| --- | --- | --- |
| Clarified solution of Kelzan MF | 0.8 | 1.69 |
| Relative viscosity about 2.1 | 11.2 | 4.03 |
|  | 15.4 | 4.29 |
|  | 26.5 | 4.9 |
|  | 32.4 | 5.2 |
|  | 41.7 | 7.3 |
|  | 47 | 8.7 |
|  | 58.2 | 14.8 |
|  | 73 | 18.1 |
|  | 79 | 20.9 |
|  | 103 | 28.7 |
|  | 118 | 30.7 |

EXAMPLE 2

The injection test through the Millipore filters has been applied to Xanflood under experimental conditions identical to those of example 1, Xanflood being a polysaccharide in powder sold by Xanco, an oil division of the Kelco Company.

It is found (FIG. 1, graph 2) that the mobility reduction also increases with the volume injected; $R_M$ values of about 300 and 400 are attained for respectively 100 and 200 cm³ of solution injected at a constant rate of 0.25 meter/day through a Millipore filter of 3μ pore size.

EXAMPLE 3

A biopolymer solution of the Xanthane type is prepared by fermentation with *Xanthomonas Campestris*

NRRL B 1459 from the USDA (U.S. Department of Agriculture). The culture medium has the following composition:

| | |
|---|---|
| peptone | 4 g/l |
| yeast extract | 3 g/l |
| malt extract | 3 g/l |
| K$_2$HPO$_4$ | 5 g/l |
| MgSO$_4$ | 0.5 g/l |
| glucose | 30 g/l |
| distilled water | up to 1 liter. |

*Xanthomonas campestris* is first grown in gelose tubes (culture medium with 1.% b.w. gelose) for a few days at 30° C. The contents are used to seed a Fernbach flask containing 250 ml of sterilized medium which is stirred for 72 hours on an alternative stirrer at 30° C. At the end the bacterial cell concentration is about 3 g/l (dry weight). Most of the cells are separated by centrifugation at 30,000 g (20 minutes at 5° C.). The viscosity of the solution measured with a Brookfield viscosimeter of the LVT type (25° C., 30 r.p.m., module 4) is 390 centipoises (cps). The corresponding polysaccharide concentration measured by weighing after precipitation, washing and drying is about 1.4 g/liter. 0.04% (w./vol.) of sodium azide is added to the solution which is diluted with brine made from distilled water and 5 g/l NaCl, so that the polysaccharide content is about 400 ppm and the viscosity about 2 centipoises.

As in example 1, the crude solution of biopolymer is clarified by passage first through three successive 3μ Millipore filters and then one 0.8μ Millipore filter under a constant pressure of 1 kg/cm$^2$.

The solution is then injected with a pump at a constant rate corresponding to a circulation velocity of 0.25 meter/day through a 3μ Millipore filter, the apparatus being as in example 1.

The pressure drop is determined at the inlet and outlet of the filter and a curve of mobility reduction R$_M$ is deduced therefrom versus injected volume (graph 3, FIGS. 1 and 2). It is found that R$_M$ remains substantially constant versus injected volume, and this irrespective of an injected volume greater than in experiments 1 and 2.

The direct use of the fermentation fluid previously clarified and stabilized with an efficient bactericide without isolation of the polysaccharide in powder thus does not result in clogging of the 3μ Millipore filter.

EXAMPLE 4

A fraction of the fermentation solution obtained in example 3 or a fresh fermentation solution prepared in the conditions of this example and freed of the major part of the cells by centrifugation is treated for separation of the polymer by adding pure methanol so that its concentration in the final mixture is about 50% b.w. The resulting precipitate is filtered and washed with pure methanol. The so-isolated polysaccharide is then dissolved again into a 5 g/l NaCl solution at the concentration of 400 ppm and subjected to the flow test at constant flow rate through a 3μ Millipore filter. Graph 4 of FIG. 2 is obtained, which shows a constant increase of the mobility reduction R$_M$ versus volume V of the injected solution. R$_M$=2,000 for 480 cm$^3$ of solution injected.

EXAMPLE 5

Another portion of the polysaccharide obtained in example 3 is oven-dried at 60° C. for 16 hours. The resulting product is dissolved again and brought to a concentration of 400 ppm in a 5 g/l NaCl solution. The resulting solution is subjected to the flow test at constant rate through a 3μ Millipore filter and graph 5 of FIG. 2 is obtained, which also shows a constant increase of R$_M$. For 600 cm$^3$ of solution, R$_M$ is about 200.

EXAMPLE 6

A solution of the same biopolymer as in example 3, although more concentrated, is prepared. *Xanthomonas campestris* (NRRL B 1459) is cultivated as in example 3 in Fernbach flasks. The flasks are then used (2 flasks of 250 ml) to seed a fermentation vessel of 3 liter useful volume, fit to work in aerated sterile medium and also provided with systems for regulating pH and temperature. The stirring velocity is 1,100 turns per minute, the air feed rate 0.5 vvm (air volume/reactor volume/minute) and the temperature 30° C. The pH is maintained at 6.5 by automatic addition of a normal KOH solution—Additional glucose is added by means of a pump after an initial fermentation period. A total of 50 g glucose per liter has been used for the fermentation. The results corresponding to this fermentation are given in Table II.

TABLE II

| Fermentation Time In Hours | Dry Weight Of The Cells in g · l$^{-1}$ | Dry Weight Of Biopolymer in g · l$^{-1}$ | Viscosity in cps |
|---|---|---|---|
| 0 | 0.9 | | |
| 20 | 4.6 | | 600 |
| 27 | 4.6 | 6.5 | 1,200 |
| 44 | 6.4 | 10.8 | 3,600 |
| 51 | 6.3 | 17.0 | 4,300 |
| 70 | 6.1 | 22.8 | 10,700 |

After 70 hours, the viscosity again determined with a Brookfield viscosimeter in the same conditions as above attains 10,700 centipoises, which corresponds to a biopolymer concentration, again measured by weighing after precipitation, washing and drying, of 22.8 g/liter.

The fermentation medium, after centrifugation at 30,000 g (20 minutes at 5° C.) and addition of 0.04% (w/vol) sodium azide, is so diluted as to operate at viscosity conditions close to those of example 3, then treated and tested as shown in this example. Graph 6 of FIG. 2 is obtained, which shows practically no clogging after that 600 cm$^3$ of solution have been injected through the 3μ Millipore filter.

Another portion of this fermentation fluid, made free of cell residues by centrifugation at 30,000 g (20 minutes at 5° C.) is also diluted to obtain a viscosity close to that of the above examples, then clarified as in example 1 by passage under a pressure of 1 kg/cm$^2$ through 3 Millipore filters of 3μ pore size and then through a 0.8μ filter.

This solution, which also contains a bactericide (0.04% w/vol of sodium azide) is injected at a constant rate of 0.05 m/day through a core of Fontainebleau sandstone identical to that of example 1. The evolution of the pressure drop at the ends of the core is determined, and the evolution of the mobility reduction R$_M$ is deduced therefrom. It is found that this mobility reduction slowly increases versus number of pore volumes of the injected clarified crude fluid (Table III) to finally stabilize at a R$_M$ value slightly lower than 4 for more than 170 volumes of pore injected.

When comparing the results of Table III with those of Table I, it is found that the fermentation fluid, when centrifuged and protected with an efficient bactericide, has low clogging effect, in any case far lower than that of a powdered product of the trade, when employed in the same conditions.

TABLE III

| | VOLUMES OF PORES ($V_p$) | MOBILITY REDUCTION ($R_M$) |
|---|---|---|
| Clarified fermentation fluid | 1 | 2.33 |
| Relative viscosity about 2 | 2.4 | 2.44 |
| | 5.2 | 2.50 |
| | 15.0 | 2.84 |
| | 23.0 | 2.95 |
| | 30.5 | 3.18 |
| | 60.8 | 3.75 |
| | 81.4 | 3.81 |
| | 99.7 | 3.86 |
| | 127 | 3.92 |
| | 173 | 3.92 |

EXAMPLE 7

A portion of the solution obtained in example 6, after elimination of the cells by centrifugation, is treated with methanol as in example 4. The resulting precipitate is subjected to the same flow test at constant rate through a 3μ Millipore filter, and a quick increase of mobility $R_M$ is observed, with respect to the volume V of solution injected.

EXAMPLE 8

Another portion of the preceeding precipitate is oven-dried in the conditions of example 5. It is dissolved in the same conditions as before and the solution is subjected to the flow test at constant rate through a 3μ Millipore filter: quick clogging of the filter occurs.

EXAMPLE 9

Example 6 is repeated, but 0.04% sodium azide is replaced with 50 parts per million (weight/volume) of Kathon. The graph is practically identical to graph 6 of FIG. 2, which shows the great effectiveness of this material.

The test of mobility reduction was carried out at the same concentration of material. The values observed were substantially those of Table III.

EXAMPLE 10

Example 3 has been repeated except that 0.04% sodium azide has been replaced with 1500 ppm (w/vol) of 37% formaldehyde solution. A substantially identical result has been obtained.

It has however been found that formaldehyde cannot be used over about 50° C., since gels can form, which clog the formation.

What we claim is:

1. An aqueous composition suitable for direct use in waterflood oil recovery processes, which comprises a clarified and stabilized fermentation fluid containing at least one bactericidal agent, said clarified and stabilized fermentation fluid being obtained by a process consisting essentially of the steps of:
   (a) culturing a polysaccharide-producing microorganism in an aqueous culture medium to produce an aqueous culture containing dissolved polysaccharide therein; and
   (b) clarifying and stabilizing the resultant aqueous culture from step (a), the clarification being effected by at least one of centrifugation and filtration, and the stabilization being effected by introducing therein at least one bactericidal agent, and recovering the resultant clarified and stabilized fermentation fluid containing said at least one bactericidal agent;

whereby said aqueous composition is obtained without precipitation and recovery of a solid polysaccharide and dissolution thereof in an aqueous medium and is suitable for direct use in waterflood oil recovery processes.

2. A composition according to claim 1, wherein the bactericidal agent is sodium azide.

3. A composition according to claim 2, wherein sodium azide is used in an amount of 10 to 2,000 parts per million by weight of the clarified fermentation fluid.

4. A composition according to claim 1, wherein the clarification treatment is effected by centrifugation at at least 4,000 g.

5. A composition according to claim 1, wherein the polysaccharide-producing microorganism is a microorganism of the Xanthomonas type.

6. A composition according to claim 1, which has a polysaccharide concentration of 0.005 to 1% by weight and a viscosity of from 2 to 30 centipoises at the reservoir temperature.

7. A composition according to claim 1, wherein the bactericidal agent is a mixture of 5-chloro-2-methyl-4-isothiazolin-3-one and 2-methyl-4-isothiazolin-3-one.

8. A composition according to claim 7, wherein said mixture is used in an amount of 10 to 1,000 parts per million by weight.

9. A composition according to claim 5, wherein the microorganism is *Xanthomonas campestris*.

10. A composition according to claim 1, wherein the clarification treatment is effected by centrifugation at from 6,000 to 60,000 g, followed by passage through at least one 3μ filter, and thereafter passage through a 0.8μ filter.

11. A composition according to claim 1, wherein the clarification treatment is effected by passage through a bed of diatomaceous earth.

12. A composition according to claim 1, wherein the clarification treatment is effected by passage through a filter whose pores have an average diameter of at most 3 microns.

13. In a method for the assisted recovery of oil from an underground oil containing formation, wherein an aqueous polysaccharide solution is flooded through the formation and oil is recovered from said formation;

the improvement comprising employing as said aqueous polysaccharide solution a composition comprising a clarified and stabilized fermentation fluid containing at least one bactericidal agent, said clarified and stabilized fermentation fluid being obtained by a process consisting essentially of the steps of:
   (a) culturing a polysaccharide-producing microorganism in an aqueous culture medium to produce an aqueous culture containing dissolved polysaccharide therein; and
   (b) clarifying and stabilizing the resultant aqueous culture from step (a), the clarification being effected by at least one of centrifugation and filtration, and the stabilization being effected by introducing therein at least one bactericidal agent, and recovering the resultant clarified and stabilized fermentation fluid containing said at least one bactericidal agent;

whereby said aqueous composition is obtained without precipitation and recovery of a solid polysaccharide and dissolution thereof in an aqueous medium and is suitable for direct use in waterflood oil recovery processes.

14. The method of claim 13, wherein said composition has a polysaccharide concentration of 0.005 to 1% by weight and a viscosity of 2 to 30 centipoises at the reservoir temperature.

15. The method of claim 13, wherein the bactericidal agent is sodium azide in an amount of 10 to 2,000 parts per million by weight of the clarified fermentation fluid.

16. The method of claim 13, wherein the clarification treatment is effected by centrifugation at at least 4,000 g.

17. The method of claim 13, wherein the polysaccharide-producing microorganism is a microorganism of the Xanthomonas type.

18. The method of claim 13, wherein the bactericide is a mixture of 5-chloro-2-methyl-4-isothiazolin-3-one and 2-methyl-4-isothiazolin-3-one, wherein said mixture is used in an amount of 10 to 1,000 parts per million by weight.

19. The method of claim 17, wherein the microorganism is *Xanthomonas campestris*.

20. The method of claim 13, wherein the clarification treatment is effected by centrifugation at from 6,000 to 60,000 g, followed by passage through at least one $3\mu$ filter, and thereafter passage through a $0.8\mu$ filter.

21. The method of claim 13, wherein the clarification treatment is effected by passage through a bed of diatomaceous earth.

22. The method of claim 13, wherein the clarification treatment is effected by passage through a filter whose pores have an average diameter of at most 3 microns.

* * * * *